(12) United States Patent  
Chisholm (10) Patent No.: US 6,697,970 B1  
(45) Date of Patent: Feb. 24, 2004

(54) GENERIC FAULT MANAGEMENT METHOD AND SYSTEM

(75) Inventor: Sharon M. Chisholm, Ottawa (CA)

(73) Assignee: Nortel Networks Limited, Quebec (CA)

( * ) Notice: Subject to any disclaimer, the term of this patent is extended or adjusted under 35 U.S.C. 154(b) by 585 days.

(21) Appl. No.: 09/648,622

(22) Filed: Aug. 28, 2000

Related U.S. Application Data (60) Provisional application No. 60/218,147, filed on Jul. 14, 2000.

(51) Int. Cl.$^7$ ................................................ G06F 11/00
(52) U.S. Cl. ........................................................ 714/48
(58) Field of Search ............................ 714/48, 39, 15, 714/20

(56) References Cited

U.S. PATENT DOCUMENTS

| | | | |
|---|---|---|---|
| 5,659,736 A | | 8/1997 | Hasegawa et al. |
| 5,790,779 A | * | 8/1998 | Ben-Natan et al. ............ 714/39 |
| 6,115,643 A | * | 9/2000 | Stine et al. .................. 700/110 |
| 6,118,936 A | | 9/2000 | Lauer et al. ............ 395/200.53 |
| 6,338,150 B1 | * | 1/2002 | Johnson et al. ............... 714/39 |
| 6,353,898 B1 | * | 3/2002 | Wipfel et al. ................. 714/48 |
| 6,367,037 B1 | * | 4/2002 | Remer et al. ................. 714/47 |
| 6,373,383 B1 | * | 4/2002 | Arrowsmith et al. ........ 340/506 |
| 6,381,656 B1 | * | 4/2002 | Shankman .................... 710/18 |
| 6,425,006 B1 | * | 7/2002 | Chari et al. ................. 709/224 |
| 6,438,716 B1 | * | 8/2002 | Snover ......................... 714/57 |
| 6,564,341 B1 | * | 5/2003 | Sundaram .................... 714/43 |

FOREIGN PATENT DOCUMENTS

| | | |
|---|---|---|
| DE | 197 40 718 | 9/1999 |
| EP | 0 810 755 | 12/1997 |
| EP | 1 079 566 | 2/2001 |

OTHER PUBLICATIONS

K. McCloghrie et al., "Structure of Management Information Version 2 (SMIv2)", Network Working Group, RFC 2578, Apr. 1, 1999, pp. 1–43.

U.S. patent application Ser. No. 09/444,344, Sundaram et al., filed Nov. 9, 1999.

* cited by examiner

*Primary Examiner*—Robert Beausoliel
*Assistant Examiner*—Bryce P. Bonzo (57) ABSTRACT

A generic fault management system and method for maintaining a list of all active alarms on a network generated by managed resources (e.g. network elements) in an SNMP environment. Active alarm tables are stored and maintained in management information bases (MIBs) associated with each of the managed resources and by a distributed management component (such as by an Element Management System (EMS)-MIB and/or a Network Management Station (NMS)-Information Store (IS)). The managed resources of the network experiencing the alarms do not need to conform to a particular alarm content or behaviour. The network can be supported on any SNMP system including both on the managed resources experiencing the alarms, and any distributed management systems monitoring the managed resources. The active alarm tables of the present invention can store any alarm that can be defined using Structure of Management Information (SMI) syntax. The distributed management components can poll the active alarm tables of the NE after a disconnect or after discovery of a new NE to maintain a current active alarm list across the entire network.

19 Claims, 10 Drawing Sheets

GENERIC FAULT MANAGEMENT METHOD AND SYSTEM

CROSS REFERENCE TO RELATED APPLICATION

This application claims the benefit of U.S. Provisional Application No. 60/218,147 filed Jul. 14, 2000 entitled "Generic Fault Management Method and System".

FIELD OF THE INVENTION

The present invention relates generally to the field of network fault management, and particularly relates to a method and a system of SNMP (Simple Network Management Protocol) based management of active alarms in a network environment.

BACKGROUND OF THE INVENTION

Conventional network space includes a layered architecture of a network transport fabric comprising Network Elements (NE) for end-to-end transport of payload data across the network, and a network management layer for controlling operation of the NEs and for providing network administrative services.

A typical network management model includes: management stations, management information bases (MIB), management agents and a management protocol.

Simple Network Management Protocol (SNMP) is a common method by which network management applications can query a management agent using a supported MIB. SNMP supports the exchange of network information between hosts, typically including one or more centralized network management consoles that manage larger numbers of network elements in real-time. SNMP operates over UDP (User Datagram Protocol) at the Open Systems Interconnection (OSI) application layer.

Although SNMP was originally designed as the TCP's stack network management protocol, it can now manage virtually any network type and has been extended to include non-TCP deployed devices. SNMP is widely deployed in TCP/IP (Transmission Control Protocol/Internet Protocol) networks, but actual transport independence means it is not limited to TCP/IP. In particular, SNMP has been implemented over Ethernet and OSI transports.

A management information base (MIB) is a database of configuration, status and statistics that is stored on a network agent for access by a Network Management Station (NMS) and/or an Element Management System (EMS). An MIB consists of a repository of characteristics and parameters managed in a network element (or managed resource) such as a NIC, hub, switch, or router. Each managed resource knows how to respond to standard queries issued by network management protocols. Within the Internet MIB employed for SNMP based management, ASN.1 (Abstract Syntax Notation One) is used to describe network management variables. These variables, which include such information as error counts or on/off status of a device, are assigned a place on a tree data structure.

When a distributed management system (e.g. EMS, NMS, etc.) first learns about an SNMP-managed resource (e.g. NE), it has no way to determine what alarms (i.e. traps, abnormal conditions, interesting conditions relating to the NEs) are currently active in the system. Also, if the management system loses communication with the NE or EMS, it cannot tell if any alarms were sent out during this communications blackout. In order to provide reliable fault management, it is necessary to determine the current status of a managed resource when first encountered or after loss of communication with a managed resource.

An alarm is a kind of object that represents an abnormal condition or a condition of interest of a managed resource. An alarm is active as long as the corresponding abnormal or interesting condition remains.

Solutions have been proposed that involve the development of active alarm tables that are specific to a particular set of notifications. Such a system is described in a co-pending U.S. patent application Ser. No. 09/444,344 filed on Nov. 19, 1999 titled Carrier-Grade SNMP Interface for Fault Monitoring assigned to the same assignee as the present application. The prior art solutions do not support existing standard and proprietary notifications and would require an NE to redefine its internal notification list to obtain active alarm functionality.

There is need for a solution where active alarm tables can be maintained that can support any alarm/trap from a plurality of managed resources (e.g. NE, EMS, etc.) regardless of native format. Further, alarms should be capable of being removed from the active alarm table when a clear alarm notification is generated by the NE or after a prescribed time-out period.

SUMMARY OF THE INVENTION

The present invention provides a table, associated with a managed resource (e.g. NE, EMS, NMS etc.) that can be maintained in a respective information store (e.g. MIB), for maintaining a list of active alarms of the managed resource in a generic format dictated by the managed resource. In particular, the table associated with an NE maintains a list of alarm notification information for its own NE; the table associated with a management system (e.g. EMS, NMS) maintains a list of alarm notification information for a group of NEs within its domain.

The present invention is also directed to a method and apparatus for maintaining a list of active managed resource alarms within a network. The list is preferable maintained in an active alarm table associated with each managed resource (for example in an NE-MIB) and with at least one management component (for example an EMS or NMS). The alarms are removed from the tables either after a clear notification is received from the managed resource or after a prescribed age-out or time-out period. The active alarm table supports alarms in the generic or native format of the NE. A "generic" or "native" format is a format that the managed resources are currently using for their standard and proprietary alarms.

In accordance with one aspect of the present invention there is provided an active alarm table associated with a management information base of a managed resource having a set of defined alarms in an SNMP (Simple Network Management Protocol) based network. The active alarm table includes a list of alarm notification information in the native format of the managed resource. The managed resource advises the management information base of the existence, occurrence and removal of an alarm on the managed resource such that the list of alarm notification information for the managed resource provides a listing of all active alarms for the managed resource.

In accordance with another aspect of the present invention there is provided a management information base associated with a management system in an SNMP (Simple Network Management Protocol) based network having a plurality of managed resources, each one of the managed resources includes a set of alarms in a native format. The management information base includes an active alarm table for maintaining alarm notification information in the native format of the plurality of managed resources. Each one of the of managed resources advises the management system of the existence, occurrence and removal of an alarm on a respective managed resource such that a list of active alarms for the managed resources in the network are provided in the active alarm table of the management information base.

In accordance with one aspect of the present invention there is provided a method of SNMP (Simple Network Management Protocol) based fault management in a network having a plurality of managed resources monitored by a management system. Each one of the managed resources has a set of defined alarms and a first active alarm table. The method includes the following steps: maintaining the first active alarm table of each of the managed resources in response to an occurrence and removal of an alarm from the set of defined alarms; and advising the management system of the occurrence and removal of the alarm.

In accordance with another aspect of the present invention there is provided a method of SNMP (Simple Network Management Protocol) based fault management in a network having a plurality of managed resources monitored by a management system. Each one of the managed resources includes a set of defined alarms and a first active alarm table. The method includes the following steps: updating the first active alarm table of a target managed resource with alarm notification information in response to an occurrence of an alarm from the set of defined alarms in the target managed resource, the target managed resource being one of the plurality of managed resources; advising the management system of the alarm with the alarm notification information; removing the alarm notification information from the first active alarm table of the target managed resource in response to a return to normal notification received from the target managed resource; and advising the management system of the return to normal notification.

In accordance with another aspect of the present invention there is provided a system for enabling SNMP (Simple Network Management Protocol) based fault management in a network having a plurality of managed resources each having a set of defined alarms and a first active alarm table. The managed resources are monitored by a management system that includes a second active alarm table. The system includes the following components: a resource manager for maintaining the first active alarm table of each of the managed resources and for advising the management system in response to an occurrence and removal of an alarm from the set of defined alarms; and (b) a system manager for maintaining the second active alarm table in response to advisement of the occurrence and removal of the alarm from the resource manager.

In an exemplary aspect of the present invention provides for consumption of the active alarm tables. For example, when an EMS discovers or regains connectivity to an NE, the EMS will poll the active alarm table of the respective NE to update its own active alarm table. It may further update other management components in the network (such as an NMS).

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Further features and advantages of the present invention will be described in the detailed description, taken in combination with the appended drawings, in which.

DETAILED DESCRIPTION OF EMBODIMENT(S) OF THE PRESENT INVENTION

Figure 1:
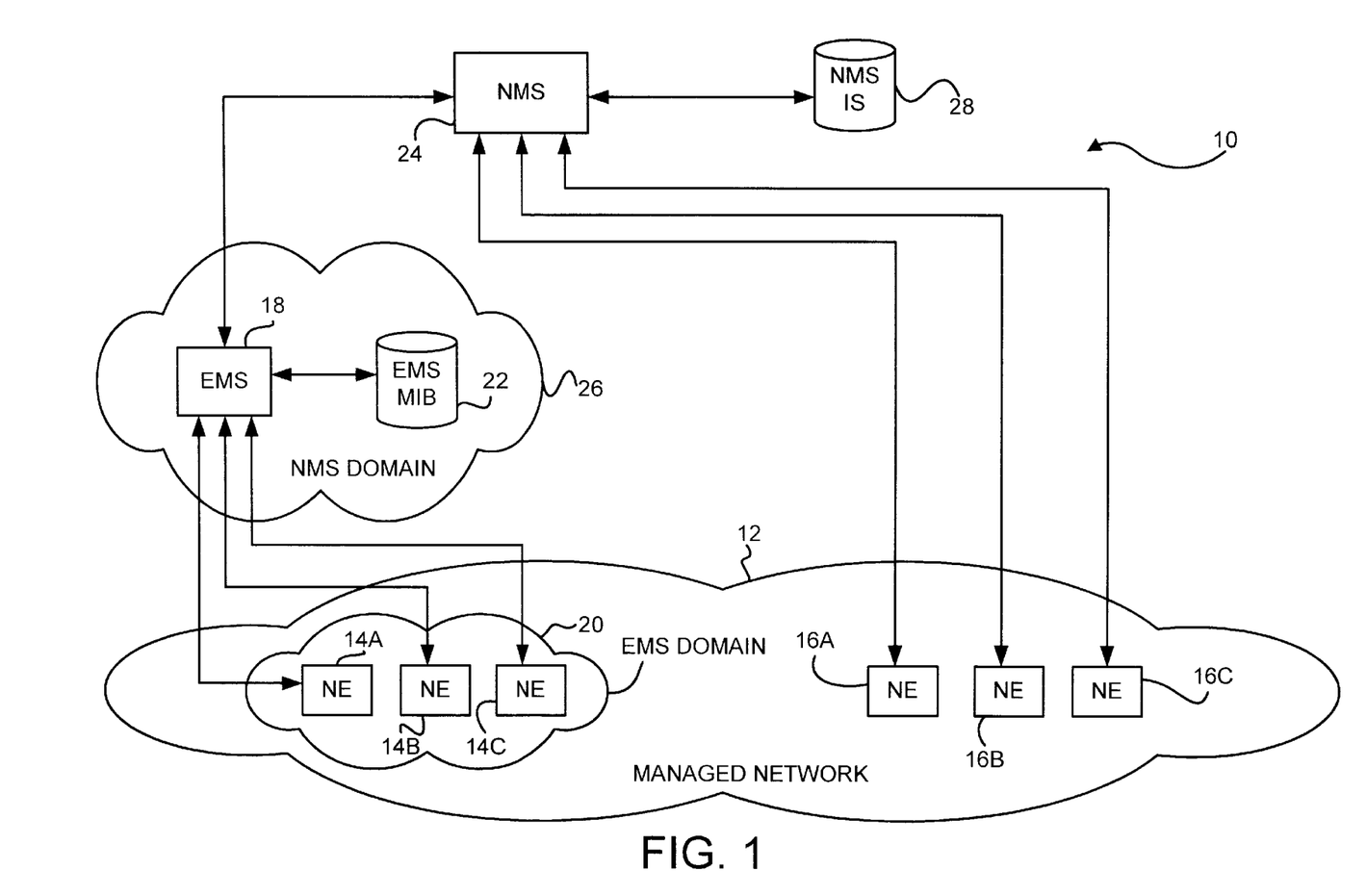
FIG. 1 is a schematic representation of a network topology used to illustrate the generic fault management method and system of the present invention.

FIG. 1 illustrates an exemplary network topology 10 to illustrate the generic fault management method and system of the present invention. The network 10 includes a managed communications network 12 (such as the Internet) that include a plurality of network elements (NEs) 14A–C and 16A–C, which are interconnected by respective links (not shown).

A network element (NE) is essentially any managed resource that includes processor-controlled entities of the network 10 that primarily provides switching and transport network functions and contains network operations functions. Examples are: non-AIN and AIN switching systems, digital cross-connect systems, and Signaling Transfer Points (STPs). In SONET, for example, five basic network elements are: add/drop multiplexer, broadband digital cross-connect; wideband digital cross-connect, digital loop carrier and switch interface.

The network 10 includes one or more first managers 18 (only one shown), such as Element Management System (EMS) agents, connected to one or more respective NEs 14A–C to facilitate direct management and control of each NE 14A–C within the managed network 12. The EMS agent 18 has an EMS-domain 20 that encompasses the set of NEs 14A–C. To facilitate management of the NEs 14A–C within its domain 20, each EMS-agent 18 maintains a respective EMS Management Information Base (EMS-MIB) 22.

End-to-end management across the network 10 is provided by one or more (only one shown) second managers 24 (such as Network Management System (NMS) agents), which are connected to the EMS 18 or directly to the NEs 16A–C. Each NMS 24 has a respective NMS domain 26 that encompasses the EMS agent 18 within its domain. The NMS 24 maintains a respective NMS Information Store (NMS-IS) 28.

Communication and signaling between: (a) the EMS agent 18 and its associated NMS 24; (b) the EMS agent 18 and the NEs 14A–C; and (c) the NMS 24 and the NEs 16A–C are handled using SNMP messaging over UDP (User Datagram Protocol) transport services. Signaling is typically accomplished using SNMP polling request/response cycles initiated by the NMS 24, and unsolicited SNMP notifications sent by the EMS agent 18 to the NMS 24. The unsolicited SNMP notifications will normally be triggered by reception of an NE event notification by the EMS agent 18.

An alarm is a type of object that represents an abnormal condition or a condition of interest for the NEs 14A–C, 16A–C or the EMS 18. An alarm is considered active as long as the corresponding abnormal condition or condition of interest is maintained by the NE 14A–C, 16A–C or the EMS 18.

Examples of typical alarms on a multiplexor managed resource are listed in Table A1.

TABLE A1

| ALARM NAME | DESCRIPTION |
| --- | --- |
| Alarm-circuit-card-missing | Circuit card missing |
| Alarm-autoprov-mismatch | Auto-provisioning mismatch |
| Alarm-rx-los | RX loss of signal |
| Alarm-rx-oif | RX optical input failure |
| Alarm-tx-lol-a | TX loss of lock-plane A |
| Alarm-forced-path-switch | Forced path switch |
| Alarm-loss-of activity | Loss of activity |
| Alarm-backplane-signal-fail | Backplane signal failure |

Figure 3:
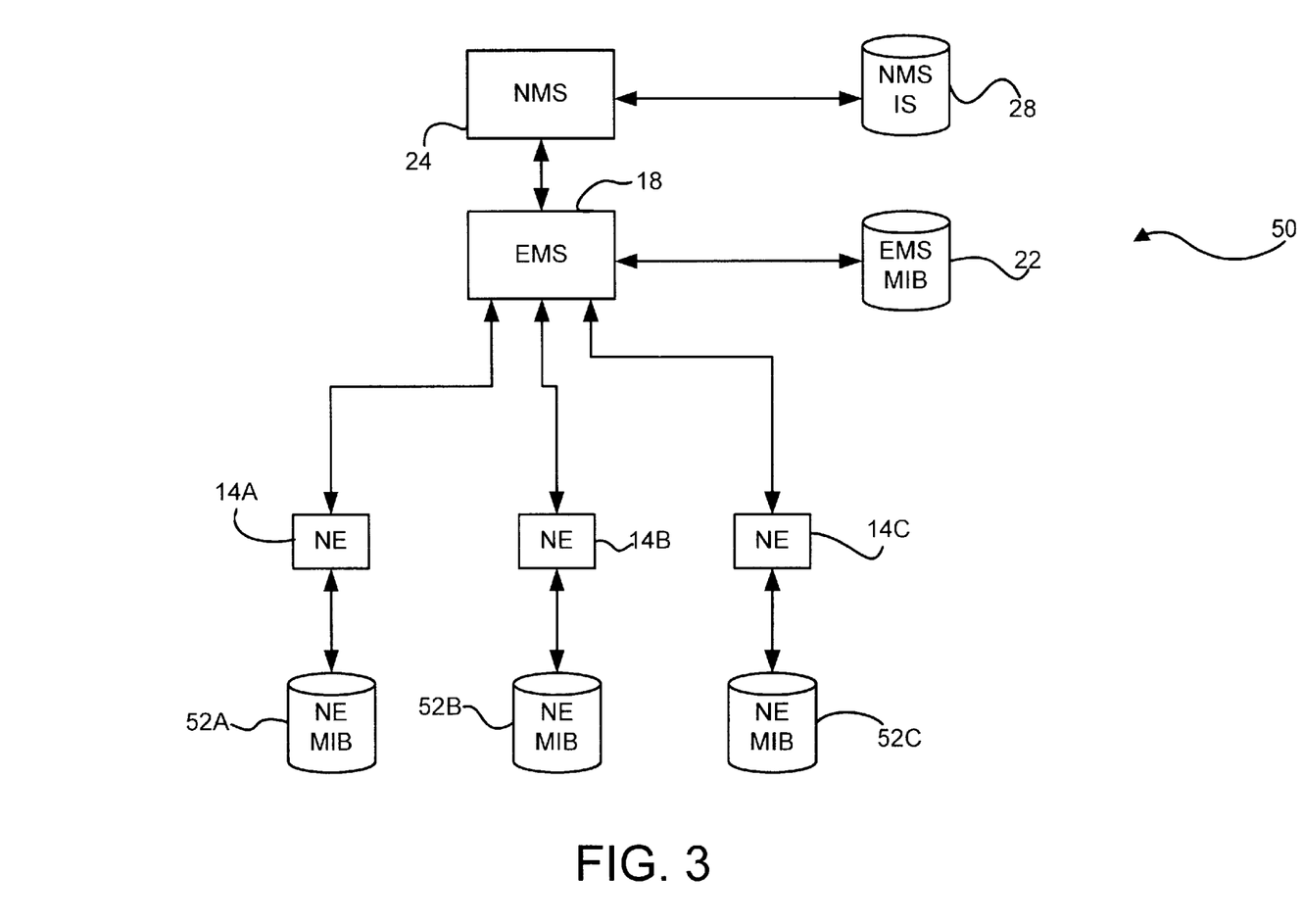
FIG. 3 is a schematic representation of network elements managed via an element management system according to an embodiment of the present invention.
Figure 4:
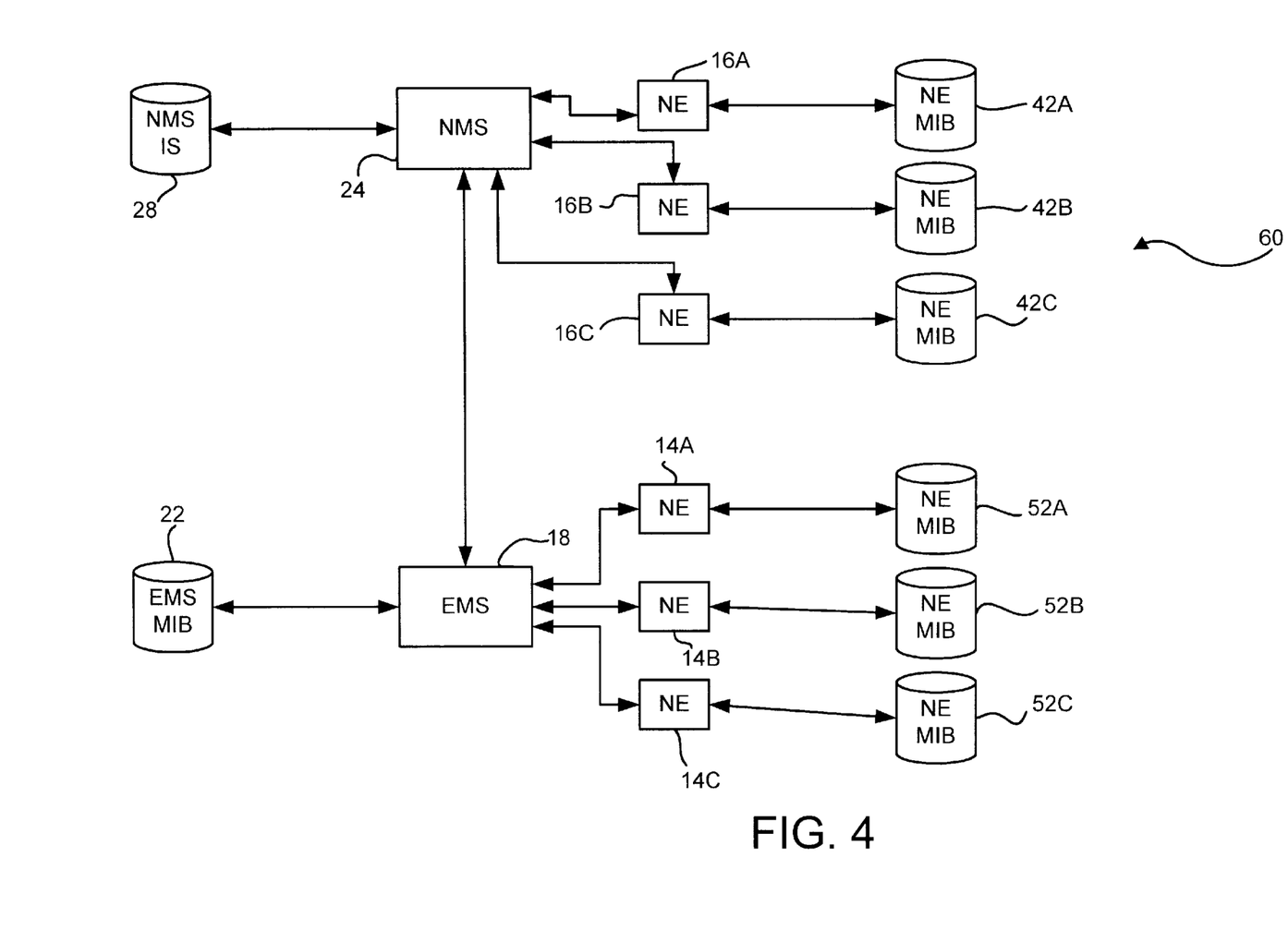
FIG. 4 is a schematic representation of mixed network element management according to an embodiment of the present invention.

In general, the management of the alarms occurring on the NEs 14A–C, 16A–C is accomplished using active alarm tables (discussed in detail in conjunction with FIGS. 5A–C) where the NE alarms are stored in a generic or native format. An active alarm table is stored in an MIB of the NE, the EMS-MIB 22 and/or the NMS-IS 28 depending on configuration (various configurations are shown in FIGS. 2 to 4).

Figure 2:
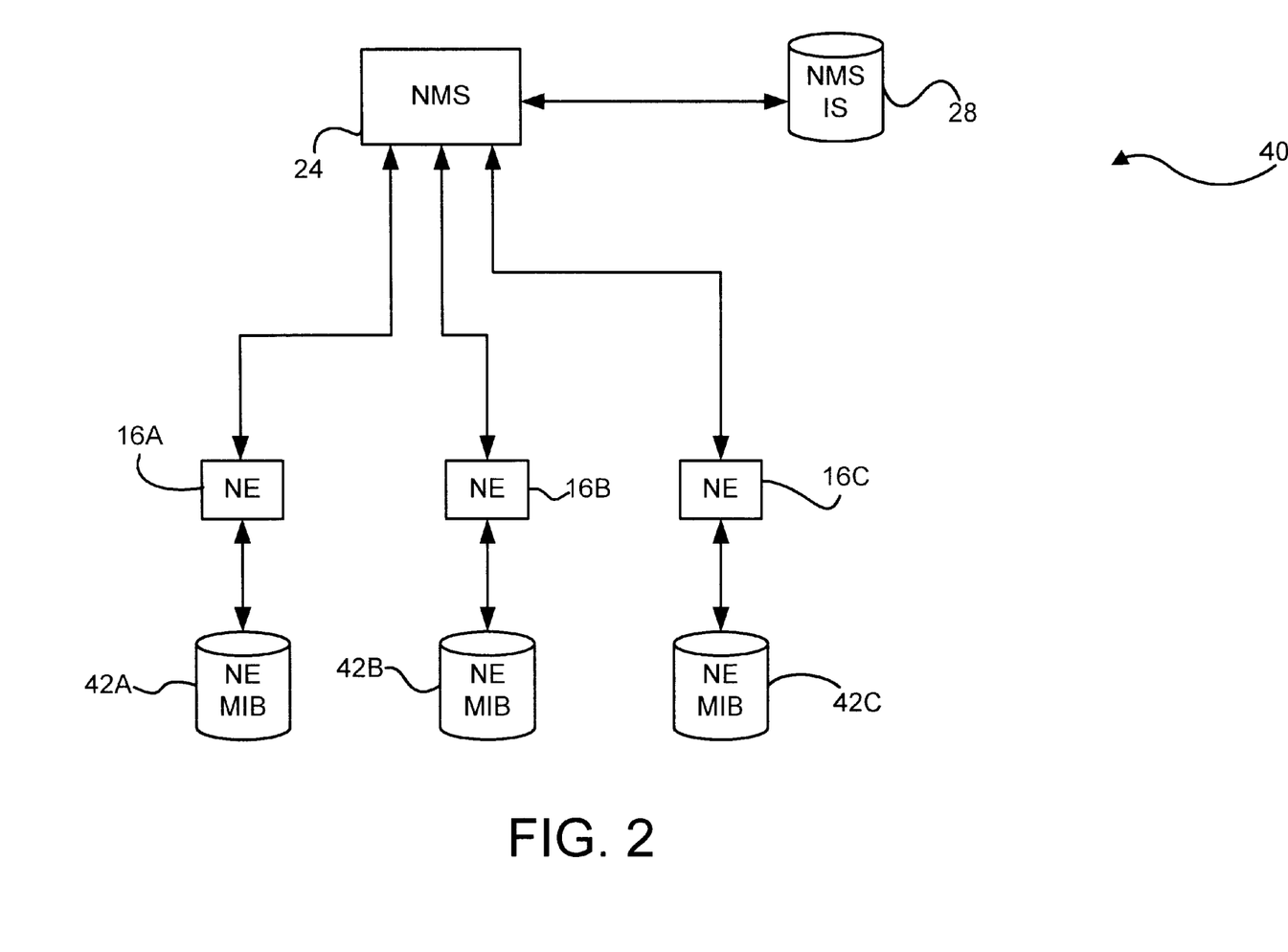
FIG. 2 is a schematic representation of directly managed network elements according to an embodiment of the present invention.

FIG. 2 represents a directly managed arrangement 40 where the NEs 16A–C are managed directly by the NMS 24. Each NE 16A–C includes a corresponding network element management information base (NE-MIB) 42A–C that function as a resource manager to maintain and manage entries in the active alarm table (i.e. populate-add, clear-remove and time-out). FIG. 3 represents an EMS management arrangement 50 where the NEs 14A–C are managed through the EMS 18. Each NE 14A–C includes a corresponding NE-MIB 52A–C that function as a resource manager to maintain and manage entries in the active alarm table. FIG. 4 represents a mixed managed arrangement 60 where the NEs 16A–C are managed directly by the NMS 24 and the NEs 14A–C are managed through the EMS 18.

Figure 5A:
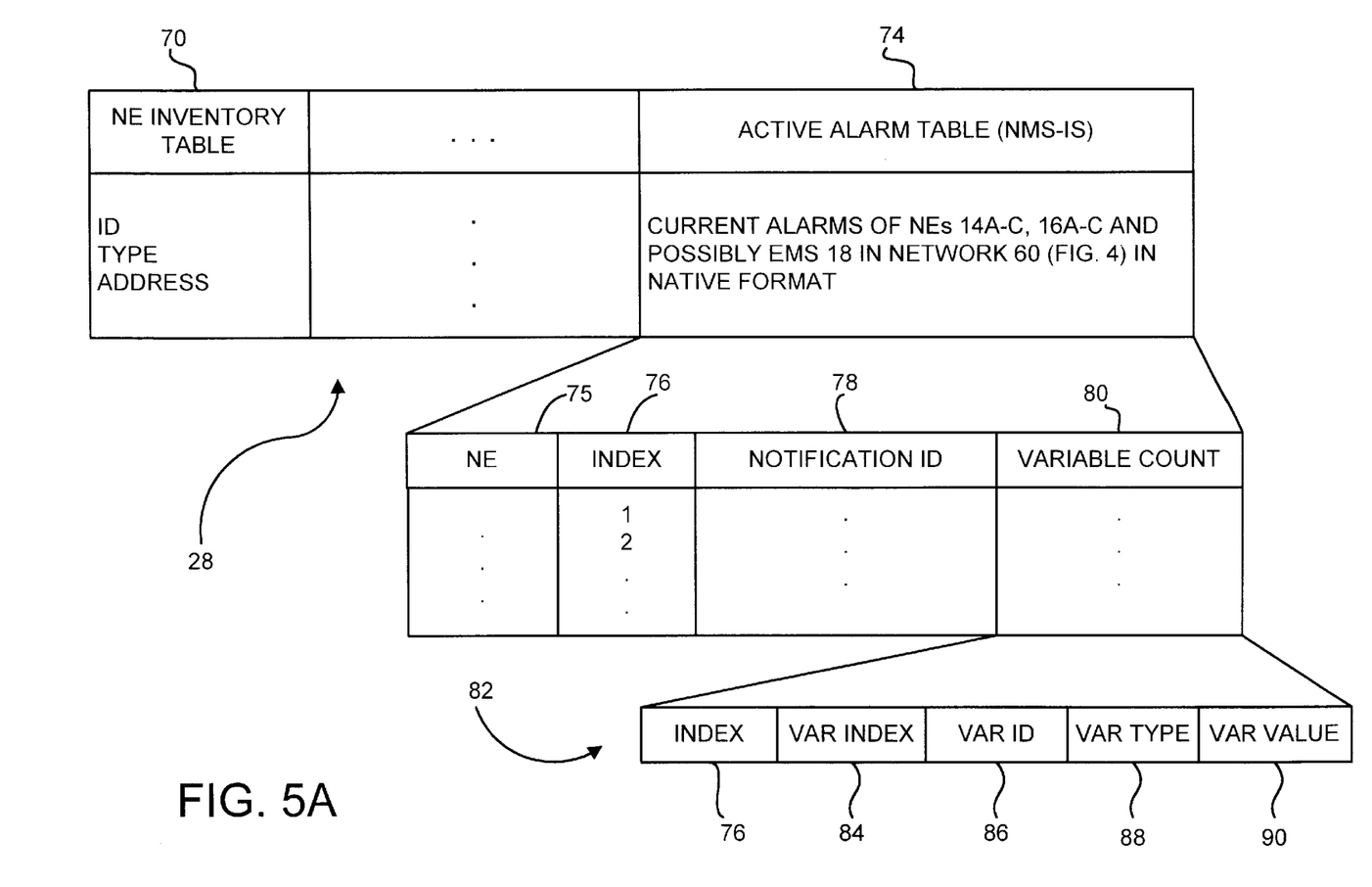
FIG. 5A is a schematic representation of an NMS information store (NMS-IS) according to an embodiment of the present invention.

FIG. 5A provides a schematic representation of the NMS-IS 28 incorporating a list of active alarms according to an embodiment of the present invention. The NMS-IS 28 functions as a system manager to include summarized information concerning the identity and status of the NEs 14A–C, 16A–C and possibly the EMS 18 in the network 60. Specifically, the NMS-IS 28 includes an NE inventory table 70 and an active alarm table 74 having alarm information supplied by the NEs 14A–C, 16A–C and the EMS 18. The NMS-IS 28 can further include other information such as state tables and the like depending on implementation and are well known to those skilled in the art.

The active alarm table 74 is a list of currently active alarms within the network 60. Alarms are stored in the table 74 in generic or native format of the NE 14A–C, 16A–C. The alarms are removed via a clear alarm signal from the NEs 14A–C, 16A–C or are aged out as discussed in more detail below. The active alarm table 74 of the NMS-IS 28 includes a network element identifier 75, an alarm index 76, a notification identifier 78 and a variable count 80.

The variable count 80 includes information to a further supporting alarm variable table 82 that includes the alarm index 76, an alarm variable index 84, an alarm variables identifier 86, an alarm variable type 88 and an alarm variable value 90.

The NE identifier 75 is an object identifier of the NE 14A–C, 16A–C with an active alarm. The active alarm index 76 is a monotonically increasing integer for indexing entries within the table 74. The alarm notification identifier 78 a notification-type object identifier of the notification that occurred. The variable count 80 is the number of variables in the alarm variable table 82 for a particular notification.

The alarm variable index 84 is a monotonically increasing integer, starting at 1 for a given alarm index 76, for indexing variables within the active table 74. The variable identifier 86 is the variable's object identifier. The variable type 88 is the type of the value. One of the value objects (90) is instantiated based on this type. The variable value 90 can represent, for example, counter32, unsigned32, time ticks, integer32, octet string, ipaddress, object identifier, counter64 or opaque.

Figure 5B:
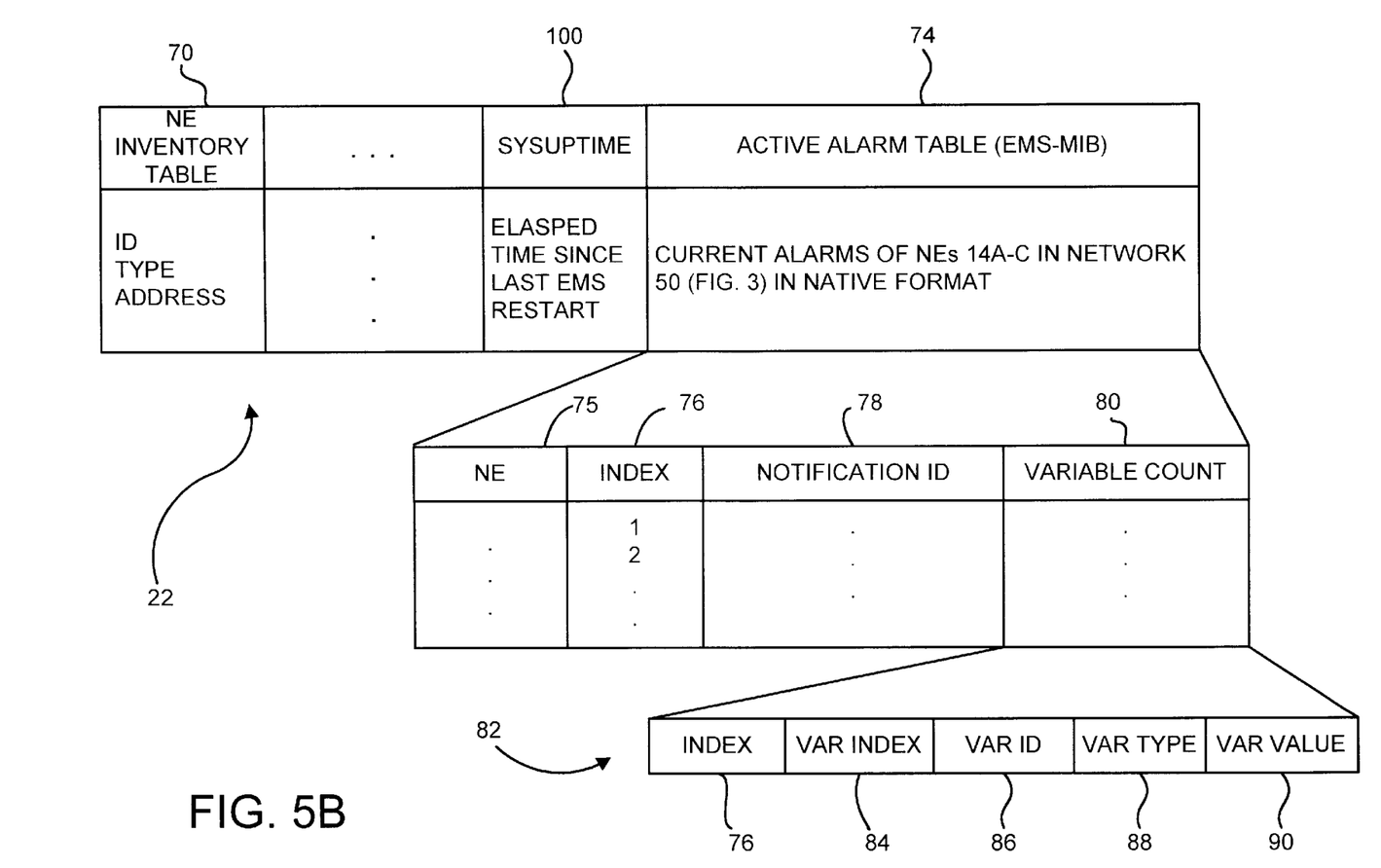
FIG. 5B is a schematic representation of an EMS management information base (EMS-MIB) according to an embodiment of the present invention

FIG. 5B provides a schematic representation of the EMS-MIB 22 that functions as a system manager incorporating the tables 74 and 82 for maintaining active alarm information from the NEs 14A–C according to an embodiment of the present invention. The EMS-MIB 22 includes the active alarm table 74 and a sysuptime 100 that stores time elapsed since the last restart of the EMS 18 and the NE inventory table 70. As with the NMS-IS 28, the EMS-MIB 22 can further include other information such as state tables and the like depending on implementation and are well known to those skilled in the art.

Figure 5C:
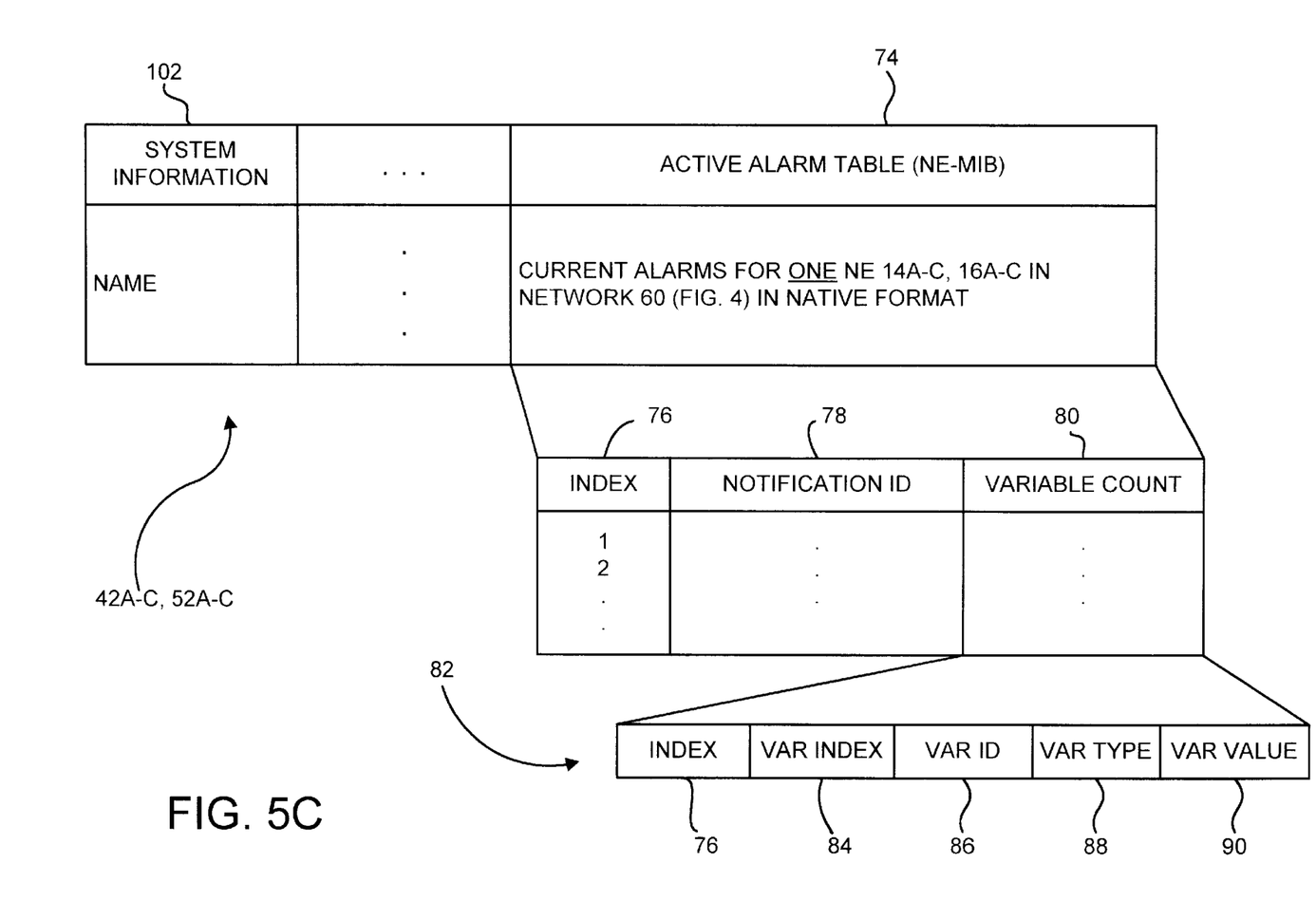
FIG. 5C is a schematic representation of an NE management information base (NE-MIB) according to an embodiment of the present invention.

FIG. 5C provides a schematic representation of the NE-MIBs 42A–C, 52A–C incorporating the tables 74 and 82 for maintaining active alarm information from each respective NEs 14A–C, 16A–C according to an embodiment of the present invention. The NE-MIBs 42A–C, 52A–C includes the active alarm table 74 and a system information table 102 for storing the name of the NE. The NE identifier field 75 in table 74 is not required since this information is stored in table 102. As with the NMS-IS 28, the NE-MIBs 42A–C, 52A–C can further include other information such as state tables and the like depending on implementation and are well known to those skilled in the art.

The EMS 18 notifies the NMS 24 (arrangement 50-FIG. 3) or the NEs 16A–C notify the NIMS 24 directly (arrangement 40-FIG. 2) of occurrences of various problems in the NEs 14A–C, 16A–C, as well as when these problems are corrected or timed-out.

Alarm clear notifications are used to indicate that one or more previously reported problems have been cleared. An alarm time-out/age-out is used to indicate that a previously reported problem can be removed from the alarm table 74 after a prescribed period of time. The alarm clear notification and the time-out/age-out are referred to generically as a return to normal notification.

Figure 6:
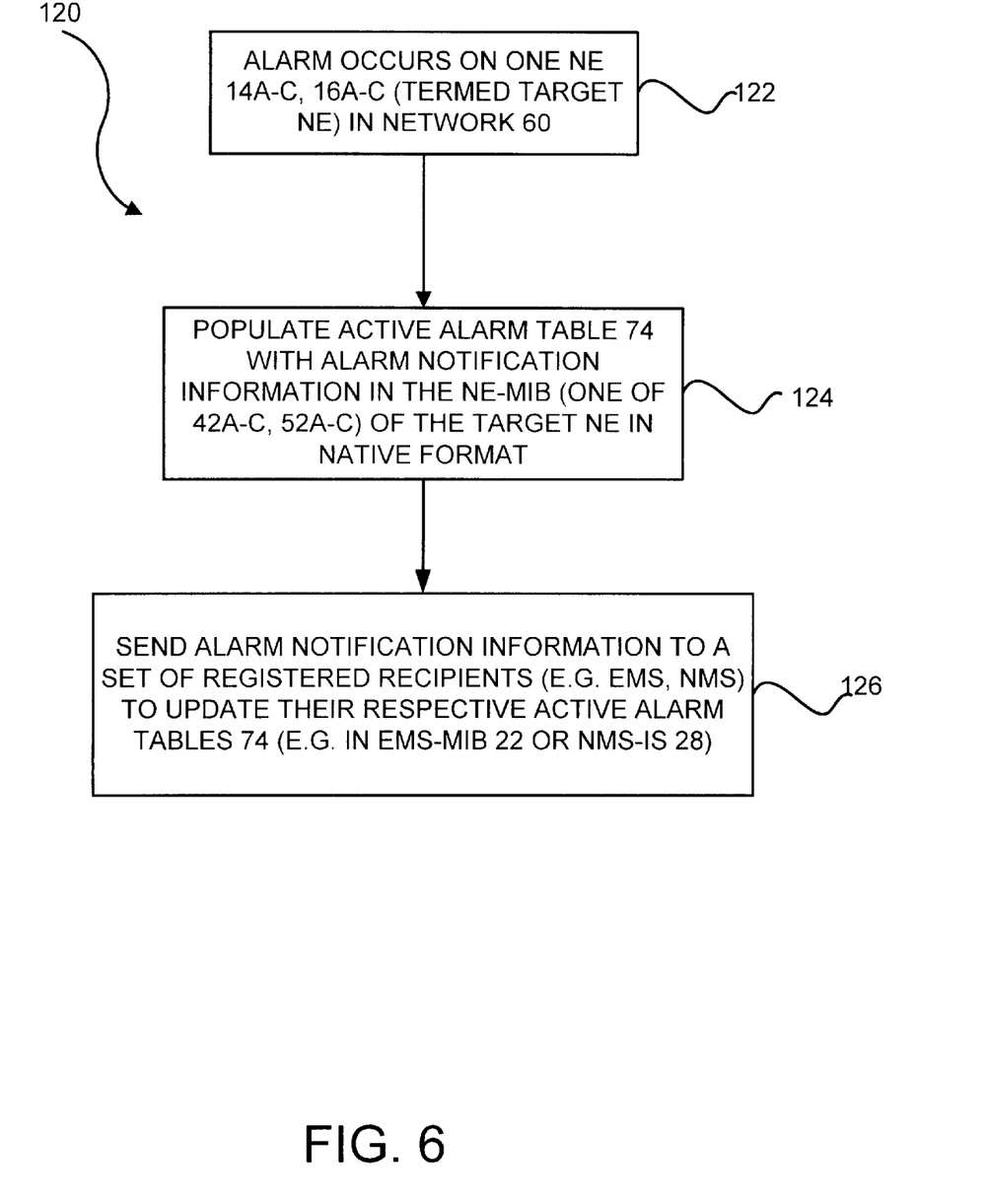
FIG. 6 is a flow chart illustrating an alarm occurrence process component of the method of generic fault management according to an embodiment of the present invention.

FIG. 6 provides a flow chart illustrating an alarm occurrence process 120 as a component of the generic fault management method according to the present invention. An alarm occurs on one of the NEs 14A–C, 16A–C (termed the target NE) in network 60 at step 122. The active alarm table 74 of the target NE's MIB (i.e. the table 74 in one of NE-MIB 42A–C, 52A–C) is populated in the native format of the target NE at step 124. At step 126, alarm notification information is sent to a set of registered recipients (i.e. registered by the NE), such as distributed management systems 18, 24 (e.g. EMSs, NMSs and the like), to update their respective active alarm tables 74.

For example, NE 14B generates an alarm: table 74 of NE-MIB 52B (FIG. 5C) is populated with alarm information; NE 14B advises EMS 18 to update table 74 of EMS-MIB 22 (FIG. 5B), and possibly also to NMS 24 to update table 74 of NMS-IS 28 (FIG. 5A) depending on environment.

Figure 7:
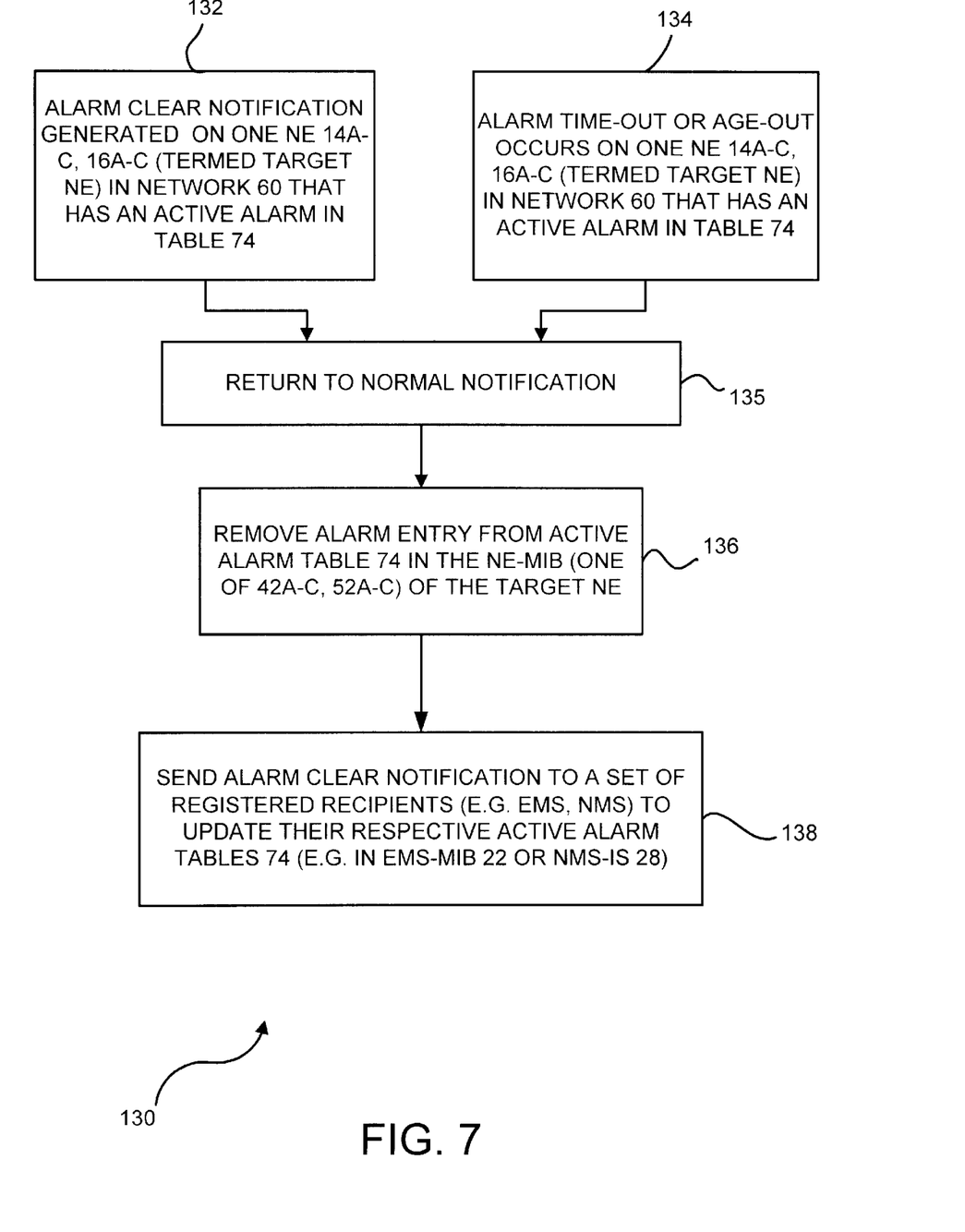
FIG. 7 is a flow chart illustrating an alarm removal process component of the method of generic fault management according to an embodiment of the present invention.

FIG. 7 provides a flow chart illustrating an alarm removal process 130 as a component of the generic fault management method according to the present invention. An alarm clear notification is generated by one of the NEs 14A–C, 16A–C (termed the target NE) in the network 60 that has an active alarm in table 74 (of the NE-MIB 42A–C, 52A–C, EMS-MIB 22, and/or NMS-IS 28) at step 132. Alternatively, an alarm time-out/age-out occurs on one of the NEs 14A–C, 16A–C in the network 60 that has an active alarm in table 74 (of the NE-MIB 42A–C, 52A–C, EMS-MIB 22, and/or NMS-IS 28) at step 134.

The step 132 (clear notification) and the step 134 (time-out/age-out) are generically referred to at step 135 as a return to normal notification. The term "normal" represents a particular pre-defined operating condition of the target NE. The active alarm entry is removed from the table 74 of the target NE's MIB at step 136. At step 138, alarm clear information (i.e. clear or time-out) is sent to a set of registered recipients (i.e. registered by the NE), such as distributed management systems 18, 24 (e.g. EMSs, NMSs and the like), to update their respective active alarm tables 74.

For example, NE 16C generates an alarm clear notification: table 74 of NE-MIB 42C (FIG. 5C) is updated to remove the alarm entry for NE 16C; NE 16C advises EMS 18 to update table 74 of EMS-MIB 22 (FIG. 5B), and possibly also to NMS 24 to update table 74 of NMS-IS 28 (FIG. 5A) depending on environment.

Figure 8:
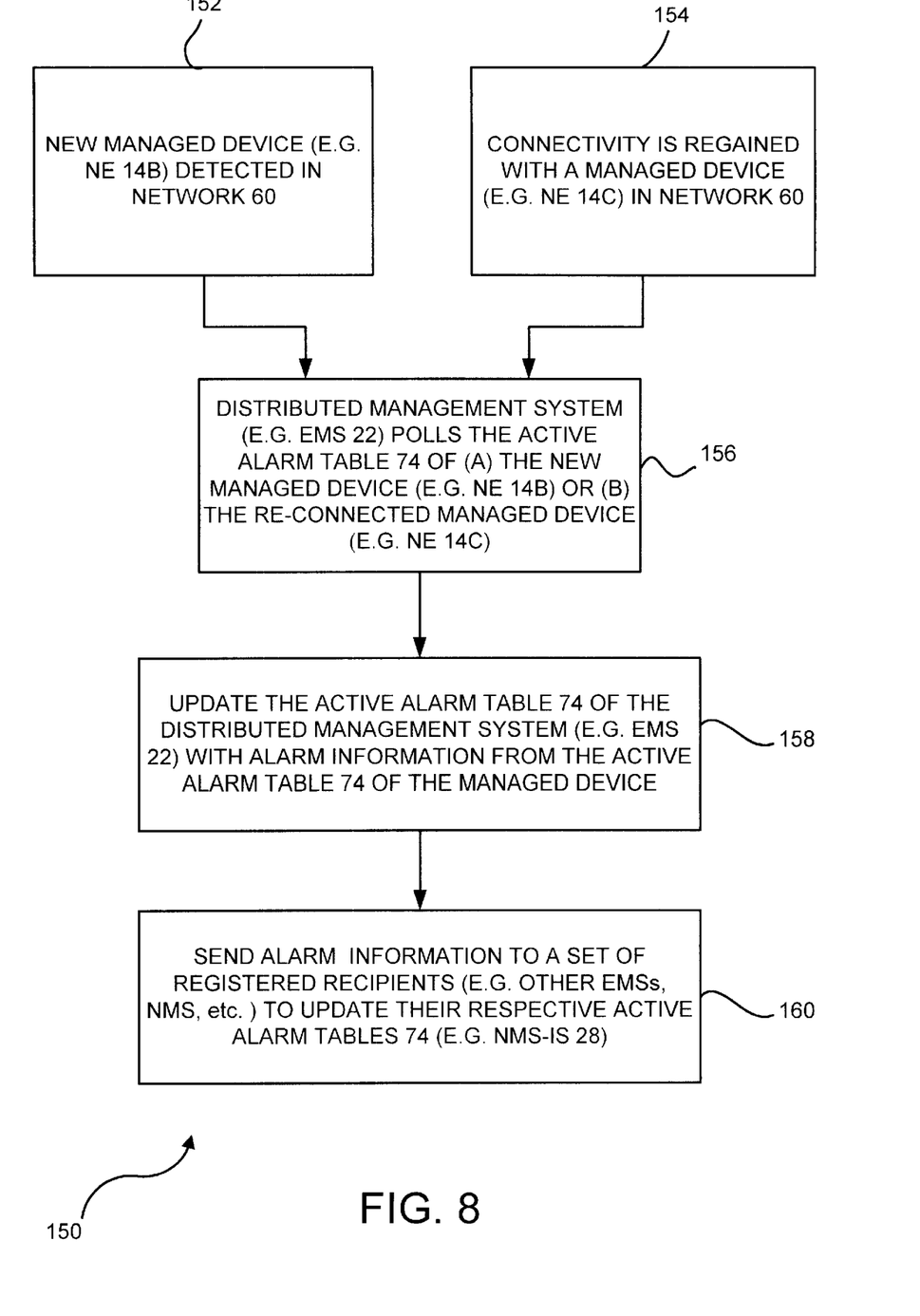
FIG. 8 is a flow chart illustrating an active alarm table consumption process component of the method of generic fault management according to an embodiment of the present invention.

FIG. 8 provides a flow chart illustrating an active alarm table consumption process 150 as a component of the generic fault management method according to the present invention. When a new managed device (e.g. NE 14B) is detected on network 60 at step 152 or when connectivity is regained with an existing managed device (e.g. NE 14C) at step 154, the distributed management system (e.g. EMS 22) polls the active alarm table 74 of either the new managed device (e.g. NE 14, with table 74 stored in NE-MIB 52B) or of the regained managed device (e.g. NE 14C, with table 74 stored in NE-MIB 52C) at step 156. The active alarm table 74 of the distributed management system (e.g. EMS-MIB 22) is updated with alarm information from the table 74 if the appropriate managed device (14B, 14C in this example) at step 158. At step 160, alarm information is sent to a set of registered recipients (i.e. registered by the NE), such as other EMSs, NMSs 24 and the like), to update their respective active alarm tables 74.

Similarly, when the NMS 24 discovers or regains connectivity to the EMS 18, it will poll the active alarm table 74 for each of the EMS supported NEs (all EMS-MIBs 22) and update its own information store (NMS-IS 28) and update the alarm state for the NEs 14A–C, 16A–C in its graphical user interface (not shown). Also, when the NMS 24 discovers or regains connectivity to a directly managed NE (as in FIG. 2), it polls the active alarm table of the respective NE (NE-MIB 42A–C, 52A–C) and updates its NMS-IS 28 and updates the alarm state for the NEs 14A–C, 16A–C in its graphical user interface.

EXAMPLE

The following example provides an exemplary implementation of the occurrence 120 and removal 130 processes of the generic fault management method of the present invention. The entries in the active alarm table 74 and the alarm variable table 82 (resident in the NE-MIB 42A–C, 52A–C, EMS-MIB 22, and/or NMS-IS 28) allow an alarm or trap to have any number of variable bindings of any valid type as defined in SMI (Structure of Management Information), for example. SMI is a set of rules and formats for defining, accessing and adding objects to the Internet MIB. The entries in the tables consist of information generic to all alarms. The "alarm variable count" field contains a total count of the number of variable bindings in the alarm/trap.

Each entry in the alarm variable table 82 consists of a type that indicates the data type of the variable binding. The alarm variable table 82 also includes one variable for each of the possible data types. One variable gets filled in with a value for the variable binding. The present invention provides the ability to age-out notifications/alarms that do not have a corresponding clear, this allows any alarm/trap to be stored within the NE-MIB 42A–C, 52A–C, EMS-MIB 22, NMS-IS 28 for retrieval by management applications known to those skilled in the art.

TABLE MANAGEMENT FOR EMS-MIB 22 (FIG. 5B)

ACTIVE ALARM TABLE 74

Network Element
Alarm Index
Alarm Notification ID
Alarm Variable Count

ALARM VARIABLE TABLE 82

Network Element
Alarm Index
Alarm Variable Index
Alarm Variables ID
Alarm Variable Type
Alarm Variable Value Referring to FIG. 4, a link down alarm occurs on NE 14A. The active alarm table 74 and the alarm variable table 82 of the EMS-MIB 22 are populated as follows:

ACTIVE ALARM TABLE

| NE | Index | Notification ID | Variable Count |
|---|---|---|---|
| 14A | 1 | LinkDown | 3 |

ALARM VARIABLE TABLE

| NE | Index | Variable Index | Variables ID | Variable Type | Variable Value |
|---|---|---|---|---|---|
| 14A | 1 | 1 | IfIndex | Integer32 | 2 |
| 14A | 1 | 2 | IfAdminStatus | Integer32 | Up(1) |
| 14A | 1 | 3 | IfOperStatus | Integer32 | Down(2) |

A link down alarm occurs on NE 14C. The active alarm table 74 and the alarm variable table 82 of the EMS-MIB 22 are populated as follows:

ACTIVE ALARM TABLE

| NE | Index | Notification ID | Variable Count |
|---|---|---|---|
| 14A | 1 | LinkDown | 3 |
| 14C | 1 | LinkDown | 1 |

ALARM VARIABLE TABLE

| NE | Index | Variable Index | Variables ID | Variable Type | Variable Value |
|---|---|---|---|---|---|
| 14A | 1 | 1 | IfIndex | Integer32 | 2 |
| 14A | 1 | 2 | IfAdminStatus | Integer32 | Up(1) |
| 14A | 1 | 3 | IfOperStatus | Integer32 | Down(2) |
| 14C | 1 | 1 | ifIndex | Integer32 | 235576 |

A switching to backup server alarm occurs on NE 14A. The active alarm table 74 and alarm variable table 82 of the EMS-MIB 22 are populated as follows:

ACTIVE ALARM TABLE

| NE | Index | Notification ID | Variable Count |
|---|---|---|---|
| 14A | 1 | LinkDown | 3 |
| 14A | 2 | acmeSwitchedServer | 1 |
| 14C | 1 | LinkDown | 1 |

ALARM VARIABLE TABLE

| NE | Index | Variable Index | Variables ID | Variable Type | Variable Value |
|---|---|---|---|---|---|
| 14A | 1 | 1 | IfIndex | Integer32 | 2 |
| 14A | 1 | 2 | IfAdminStatus | Integer32 | Up(1) |
| 14A | 1 | 3 | IfOperStatus | Integer32 | Down(2) |
| 14A | 2 | 1 | acmeServerId | Integer32 | 2 |
| 14C | 1 | 1 | ifIndex | Integer32 | 235576 |

A link up occurs on NE 14A. The link down alarm (index 1) and the associated variables are cleared from the active alarm table 74 and alarm variable table 82 of the EMS-MIB 22 as follows:

ACTIVE ALARM TABLE

| NE | Index | Notification ID | Variable Count |
|---|---|---|---|
| 14A | 2 | acmeSwitchedServer | 1 |
| 14C | 1 | LinkDown | 1 |

ALARM VARIABLE TABLE

| NE | Index | Variable Index | Variables ID | Variable Type | Variable Value |
|---|---|---|---|---|---|
| 14A | 2 | 1 | acmeServerId | Integer32 | 2 |
| 14C | 1 | 1 | ifIndex | Integer32 | 235576 |

A node name changed alarm occurs on NE 14C. The active alarm table 74 and alarm variable table 82 of the EMS-MIB 22 are populated as follows:

ACTIVE ALARM TABLE

| NE | Index | Notification ID | Variable Count |
|---|---|---|---|
| 14A | 2 | acmeSwitchedServer | 1 |
| 14C | 1 | LinkDown | 1 |
| 14C | 2 | acmeNodeNameChange | 1 |

ALARM VARIABLE TABLE

| NE | Index | Variable Index | Variables ID | Variable Type | Variable Value |
|---|---|---|---|---|---|
| 14A | 2 | 1 | acmeServerId | Integer32 | 2 |
| 14C | 1 | 1 | ifIndex | Integer32 | 235576 |
| 14C | 2 | 1 | acmeNodeName | display-string | "superswitch" |

A switch back to primary server alarm occurs on NE 14A. The active alarm table 74 and alarm variable table 82 of the EMS-MIB 22 are updated as follows:

ACTIVE ALARM TABLE

| NE | Index | Notification ID | Variable Count |
|---|---|---|---|
| 14C | 1 | LinkDown | 1 |
| 14C | 2 | acmeNodeNameChange | 1 |

ALARM VARIABLE TABLE

| NE | Index | Variable Index | Variables ID | Variable Type | Variable Value |
|---|---|---|---|---|---|
| 14C | 1 | 1 | ifIndex | Integer32 | 2 |
| 14C | 2 | 1 | acmeNodeName | display-string | "superswitch" |

A prescribed period of time passes and the server rename alarm ages out on NE 14C. The active alarm table 74 and alarm variable table 82 of the EMS-MIB 22 are updated as follows:

| ACTIVE ALARM TABLE | | | |
|---|---|---|---|
| NE | Index | Notification ID | Variable Count |
| 14C | 1 | LinkDown | 1 |

| ALARM VARIABLE TABLE | | | | | |
|---|---|---|---|---|---|
| NE | Index | Variable Index | Variables ID | Variable Type | Variable Value |
| 14C | 1 | 1 | ifIndex | Integer32 | 235576 |

In summary, the generic fault management system and method of the present invention maintains a list of all active alarms on the network 10 generated by the NEs 14A–C, 16A–C stored in the NE-MIBs 42A–C, 52A–C, EMS-MIB 22 and/or NMS-IS 28. The network 10 experiencing the alarms does not need to conform to a particular alarm content or behaviour. The network 10 can be supported on any SNMP system including both on the NEs 14A–C, 16A–C experiencing the alarms, and any distributed management systems 18 (EMSs) monitoring the NEs 14A–C. The active alarm table 74 of the present invention can store any alarm that can be defined using Structure of Management Information (SMI) syntax (the language of defining EMS-MIB 22, NMS-IS 28). This allows support of active alarm functionality for all existing and future standard and enterprise alarms.

What is claimed is:

1. A method of SNMP (Simple Network Management Protocol) based fault management in a network having a plurality of managed resources monitored by a management system, each one of the plurality of managed resources having a set of defined alarms and a first active alarm table and the management system having a second active alarm table for maintaining a record of alarms on each of the plurality of managed resources, said method comprising the steps of:
   (a) maintaining the first active alarm table of each of the managed resources in response to an occurrence and removal of an alarm from the set of defined alarms wherein the step of maintaining includes:
      (i) updating the first active alarm table of a target managed resource with alarm notification information in response to the occurrence of the alarm in the target managed resource, the target managed resource being one of the plurality of managed resources; and
      (ii) removing the alarm notification information from the first active alarm table of the target managed resource in response to a return to normal notification received from the target managed resource; and
   (b) advising the management system of the occurrence and removal of the alarm by updating the second active alarm table with the alarm notification information received from the target managed resource.

2. The method of claim 1, wherein step (b) further comprises updating the second active alarm table by removing the alarm notification information from the second active alarm table of the management system in response to the return to normal notification received from the target managed resource.

3. A method of SNMP (Simple Network Management Protocol) based fault management in a network having a plurality of managed resources monitored by a management system, each one of the plurality of managed resources having a set of defined alarms and a first active alarm table and the management system having a second active alarm table for maintaining a record of alarms on each of the plurality of managed resources, said method comprising the steps of:
   (a) updating the first active alarm table of a target managed resource with alarm notification information in response to an occurrence of an alarm from the set of defined alarms in the target managed resource, the target managed resource being one of the plurality of managed resources;
   (b) advising the management system of the alarm with the alarm notification information by updating the second active alarm table with the alarm notification information received from the target managed resource;
   (c) removing the alarm notification information from the first active alarm table of the target managed resource in response to a return to normal notification received from the target managed resource; and
   (d) advising the management system of the return to normal notification.

4. The method of claim 3, wherein the return to normal notification includes a clear notification generated by the target managed resource representing a return to a predetermined operating condition for the target managed resource.

5. The method of claim 3, wherein the return to normal notification includes an alarm age-out generated by the target managed resource after passage of a prescribed period of time.

6. The method of claim 3, wherein step (b) further comprises updating the second active alarm table by removing the alarm notification information from the second active alarm table of the management system in response to the return to normal notification received from the target managed resource.

7. The method of claim 3, further comprising the steps of:
   (e) polling the first active alarm table of the target managed resource when connectivity is regained after a period of lost connectivity between the target managed resource and the management system to obtain alarm notification information; and
   (f) updating the second active alarm table of the management system with the alarm notification information from the first active alarm table of the target managed resource.

8. The method of claim 3, further comprising the steps of:
   (e) polling the first active alarm table of a further managed resource on the network recognized by the management system to obtain alarm notification information; and
   (f) updating the second active alarm table of the management system with alarm notification information from the first active alarm table of the further managed resource.

9. A system for enabling SNMP (Simple Network Management Protocol) based fault management in a network having a plurality of managed resources each having a set of defined alarms and a first active alarm table, said plurality of managed resources being monitored by a management system having a second active alarm table, said system comprising:

(a) a resource manager for maintaining the first active alarm table of each of the managed resources and for advising the management system in response to an occurrence and removal of an alarm from the set of defined alarms; and (b) a system manager for maintaining the second active alarm table in response to advisement of the occurrence and removal of the alarm from the resource manager.

10. The system of claim 9, wherein the resource manager includes access means for updating the first active alarm table of a target managed resource with alarm notification information in response to the occurrence of the alarm in the target managed resource, the target managed resource being one of the plurality of managed resources; and for removing the alarm notification information from the first active alarm table of the target managed resource in response to a return to normal notification received from the target managed resource.

11. The system of claim 10, wherein the system manager includes access means for updating the second active alarm table with alarm notification information received from the target managed resource; and for removing the alarm notification information from the second active alarm table.

12. A management information base associated with a management system in an SNMP (Simple Network Management Protocol) based network having a plurality of managed resources, each one of the plurality of managed resources having a set of alarms in a native format, said management information base comprising:

an active alarm table for maintaining alarm notification information in the native format of the plurality of managed resources;

wherein each one of the plurality of managed resources advises the management system of the existence, occurrence and removal of an alarm on a respective managed resource such that a list of active alarms for the plurality of managed resources in the network are provided in the active alarm table of the management information base.

13. The management information base of claim 12, wherein the active alarm table includes an object for identifying one of the plurality of managed resources, an index for indexing entries in the active alarm table and a notification identifier representing alarm notification information in the native format of the managed resource.

14. The management information base of claim 13, wherein the active alarm table includes a variable count representing additional information associated with the alarm.

15. The management information base of claim 14, further comprising an active alarm variable table associated with the variable count of the active alarm table for storing variable bindings for the alarm as defined in the SMI (Structure of Management Information), said active alarm variable table comprising the managed resource identifier, the index of the alarm, a variable index for indexing entries in the active alarm variable table and a variable identifier representing information regarding the variable.

16. An active alarm table associated with a management information base of a managed resource having a set of defined alarms in an SNMP (Simple Network Management Protocol) based network, said active alarm table comprising:

a list of alarm notification information in the native format of the managed resource;

wherein the managed resource advises the management information base of the existence, occurrence and removal of an alarm on the managed resource such that the list of alarm notification information for the managed resource provides a listing of all active alarms for the managed resource.

17. The active alarm table of claim 16, wherein the list includes an index for indexing entries in the active alarm table and a notification identifier representing alarm notification information in the native format of the managed resource.

18. The active alarm table of claim 17, wherein the list includes a variable count representing additional information associated with the alarm.

19. The active alarm table of claim 18, further comprising a variable table associated with the variable count of the list for storing variable bindings for the alarm as defined in the SMI (Structure of Management Information), said variable table comprising the managed resource identifier, the index of the alarm, a variable index for indexing entries in the active alarm variable table and a variable identifier representing information regarding the variable.

* * * * *